(12) United States Patent
Buck et al.

(10) Patent No.: US 7,397,153 B2
(45) Date of Patent: Jul. 8, 2008

(54) POWER TOOL

(75) Inventors: Manfred Buck, Nuertingen (DE); Siegfried Fehrle, Leinfelden-Echterdingen (DE); Uwe Engelfried, Ostfildern (DE); Michael Weiss, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 11/195,245

(22) Filed: Aug. 2, 2005

(65) Prior Publication Data

US 2006/0028089 A1 Feb. 9, 2006

(30) Foreign Application Priority Data

Aug. 5, 2004 (DE) .................... 10 2004 037 899

(51) Int. Cl.
*H02K 7/14* (2006.01)
(52) U.S. Cl. .......................... 310/50; 310/239
(58) Field of Classification Search ............ 310/68 A, 310/68 R, 239, 50, 89–91; 451/358, 359; 285/189
See application file for complete search history.

(56) References Cited

U.S. PATENT DOCUMENTS

| | | | |
|---|---|---|---|
| 5,089,729 A * | 2/1992 | Moores, Jr. ............... | 310/50 |
| 5,138,243 A * | 8/1992 | Kress et al. ............... | 318/541 |
| 5,681,214 A * | 10/1997 | Kleider et al. ............. | 451/358 |
| 5,955,802 A * | 9/1999 | Karasa et al. .............. | 310/50 |
| 6,124,652 A * | 9/2000 | Karasa et al. .............. | 310/50 |
| 6,479,918 B1 | 11/2002 | Burger et al. | |
| 6,528,921 B1 * | 3/2003 | Nakane .................... | 310/239 |
| 6,776,439 B2 * | 8/2004 | Albrecht .................. | 285/189 |
| 6,927,512 B2 * | 8/2005 | Zeiler et al. .............. | 310/71 |

FOREIGN PATENT DOCUMENTS

| | | |
|---|---|---|
| DE | 10227782 | 1/2004 |
| EP | 0057414 | 11/1982 |
| GB | 274499 | 10/1928 |
| GB | 642006 | 10/1950 |
| GB | 1337811 | 11/1973 |

* cited by examiner

Primary Examiner—Thanh Lam
(74) Attorney, Agent, or Firm—Michael J. Striker

(57) ABSTRACT

A power tool has an electric motor, a brush element that is supported rotatably for switchover between clockwise operation and counterclockwise operation of the electric motor and includes a brush holder, and a switch unit, embodied separately from the brush element and connected in form-locking fashion to the brush element, which switch unit has an actuating element for actuation by a user, can be slipped in the axial direction onto the brush element, located on the electric motor, and is connected in the axial direction to the brush element.

13 Claims, 4 Drawing Sheets

POWER TOOL

CROSS-REFERENCE

The invention described and claimed hereinbelow is also described in DE 10 2004 037899.1, filed Aug. 5, 2004. This German Patent Application, whose subject matter is incorporated here by reference, provides the basis for a claim of priority of invention under 35 U.S.C. 119(a)-(d).

BACKGROUND OF THE INVENTION

The present invention relates to a power tool.

From German Patent Disclosure DE 102 27 782 A2, a power tool is known that has an electric motor and a rotatable brush plate, by whose rotation a switchover can be made between clockwise operation and counterclockwise operation of the electric motor. For actuation of the brush plate, the brush plate has an actuating element, located on the radially outer face of the brush plate, that is extended to the outside through a housing of the kc and can be actuated by a user.

SUMMARY OF THE INVENTION

It is an object of the invention to provide a power tool which is an improvement of existing power tools.

The invention is based on a power tool, having an electric motor, a brush element that is supported rotatably for switchover between clockwise operation and counterclockwise operation of the electric motor and includes a brush holder, and having a switch means, embodied separately from the brush element and connected in form-locking fashion to the brush element, which switch means has an actuating element for actuation by a user.

It is proposed that the switch means can be slipped in the axial direction onto the brush element, located on the electric motor, and is connected in the axial direction to the brush element. A modular system that includes the brush element and the switch means can be created, with which while the brush element remains the same and while there are different switch means, the location of the actuating element relative to the brush element and to the electric motor can be selected freely within certain limits, depending on the type of tool. The actuating element may be placed in the vicinity of a pushbutton switch. The switch means may be joined in a force-locking fashion to the brush element in the axial direction. Advantageously, the switch means is joined in form-locking fashion to the brush element in the axial direction; the form-locking connection can be produced especially simply and inexpensively by means of a form lock between one element of the switch means and one element of the brush element.

Because the switch means can be slipped in the axial direction onto the brush element located on the electric motor, the power tool is easy to assemble, since first the brush element can be secured to the electric motor, and then the switch means can be slipped onto the brush element. By means of the form-locking connection of the switch means in the axial direction to the brush element, a separate bearing of the switch means, for instance on a housing of the power tool, is not necessary. The two components joined together can be supported jointly at a suitable point. The axial direction is understood to be the axial direction of the electric motor and hence the direction of the axis of the electric motor. Expediently, the switch means can be slipped onto the brush element in the axial direction and in the direction toward the electric motor.

In an advantageous feature of the invention, the brush element has a retaining ring that supports the brush holder, and the switch means can be slipped in the axial direction onto the retaining ring. A bearing of the switch means on the brush element that is stable against tilting can be achieved.

A further increase in stability against tilting of the switch means can be achieved if the brush element includes a retaining ring that supports the brush holder, and the switch means is connected to the retaining ring in form-locking fashion in the axial direction.

By means of a detent means for detent-locking connection of the switch means on the brush element, the switch means can easily be mounted on the brush element and connected to it by form-locking. The detent means can be located on the brush element and in particular can be joined integrally to the brush element. Expediently, the detent means is connected to the switch element and in particular is embodied integrally with it. A stable connection between the switch means and the brush element can be attained if the detent means engages an element of a retaining ring, supporting the brush holder, from behind. Expediently, at least two detent means but in particular at least four of them are provided. The detent means advantageously reaches radially inward at least partway through the retaining ring and snaps into place behind the element as a result of a radially outward-oriented motion. A radially outer jacket face of the brush element can be kept free, so that a location of the brush element, independently of the switch means, in different housings of different types of power tool is possible.

A further advantage is attained if the brush element has ventilation slits. Cooling of the electric motor can be achieved in a simple way. The detent element expediently engages these ventilation slits, so that one additional retaining element for engaging the detent element from behind can be dispensed with. The detent element expediently reaches only partway through the ventilation slits, and as a result a radially outer jacket face is unaffected by the detent element.

In a further feature of the invention, the brush element has a retaining ring supporting the brush holder, and the switch means includes an annular element; the annular element rests on the retaining ring in the axial direction. Stable bearing of the switch means on the brush element, in particular against tilting, can be achieved.

The annular element advantageously engages the retaining ring from the inside. A stable bearing of the switch means on the brush element, particularly in the radial direction, can be achieved. To further advantage, the annular element and in particular the entire switch means is located outside a chamber that radially borders directly on the brush element. A radially outward-oriented jacket face of the brush element remains free of the annular element or switch means, so that the brush element can be placed in various housings, even narrow ones.

In relatively large power tools, such as a drill hammer with a front and rear handle, the brush element is located relatively far away from a pushbutton switch for actuating the power tool. Closeness of the actuating element to a pushbutton switch can be achieved if the actuating element is located at least predominantly on the side of the brush element facing away from the electric motor in the axial direction. Convenient use of the actuating element can be achieved, for instance by one hand of a user grasping the pushbutton switch. In an equivalent feature, the actuating element is located at least predominantly behind the brush element in the axial direction; the direction is defined by the fact that the electric motor is located predominantly in front of the brush element.

It is also proposed that the power tool include a centering means and the brush element include a retaining ring that supports the brush holder; the centering means is prepared for radially centering the switch means on a retaining ring upon installation of the actuating element. The switch means is especially easy to mount on the brush element. The centering means can be located on the retaining ring. Expediently, the centering means is located on the switch means, and is joined integrally to the switch means, particularly for the sake of easy manufacture of the power tool. The centering means expediently engages the inside of the retaining ring, leaving a radially outer jacket face of the brush element free. If a detent means is present, the centering means advantageously protrudes past the detent means in the axial direction, as a result of which, upon installation of the switch means on the brush element, the centering means first acts in a centering fashion, and then the detent element is brought for locking purposes to the respective diametrically opposite element. Easy mounting of the switch means on the brush element can be achieved.

In a further feature of the invention, it is proposed that the power tool includes a pushbutton switch having a turn-on position for switching the electric motor on and a turn-off position for switching the electric motor off, a securing means is connected to the pushbutton switch, and the switch means includes a blocking element for contacting the centering means, and the centering means, when the pushbutton switch is in the turn-on position, blocks rotation of the actuating element for switchover of the brush element by resting on or in other words contacting the blocking element. Rotation of the brush element when a pushbutton switch is actuated can be effectively prevented, thus counteracting wear to the power tool caused by improper use.

With the same advantage, the power tool includes a pushbutton switch having a turn-on position for switching the electric motor on and a turn-off position for switching the electric motor off, a securing means being connected to the pushbutton switch, and the switch means includes a blocking element for contacting the centering means, and the blocking element, when the brush element is rotated into an intermediate position between clockwise operation and counterclockwise operation, blocks a switchover of the pushbutton switch from the turn-off position into the turn-on position by means of a contact with the securing means. During the switchover of the brush element from clockwise operation to counterclockwise operation or vice versa, the actuation of the pushbutton switch and increased wear caused thereby to the collector, the carbon brushes and contacts, is effectively avoided.

A further advantage is attained if the power tool includes a housing having a housing wall, which at least partly demarcates a housing interior from a housing exterior, in which the actuating element is located at least partly outside the housing and is retained by at least two retaining elements protruding separately through the housing wall. The actuating element is in this way supported at at least two points and hence in a stable fashion, and as a result the actuating element can be made large in size and nevertheless can be supported stably. Moreover, the retaining elements can be passed through ventilation slits of the housing and can for instance be slender.

The invention is especially suitable for a power tool which is embodied as a hand power tool, in particular as a screwdriver, power drill, percussion power drill or drill hammer, that can be either plugged in or operated with batteries. Many different models of hand power tools are manufactured, so the variability of the switch means and of the position of the actuating element and the ease of assembly are especially highly advantageous. Locating the actuating element close to a pushbutton switch is also especially advantageous, particularly in hand power tools.

Further advantages will become apparent from the ensuing description of the drawings. In the drawing, one exemplary embodiment of the invention is shown. The drawing, description and claims include numerous characteristics in combination. One skilled in the art will expediently consider the characteristics individually as well and put them together to make useful further combinations.

DESCRIPTION OF THE PREFERRED EMBODIMENT

Figure 1:
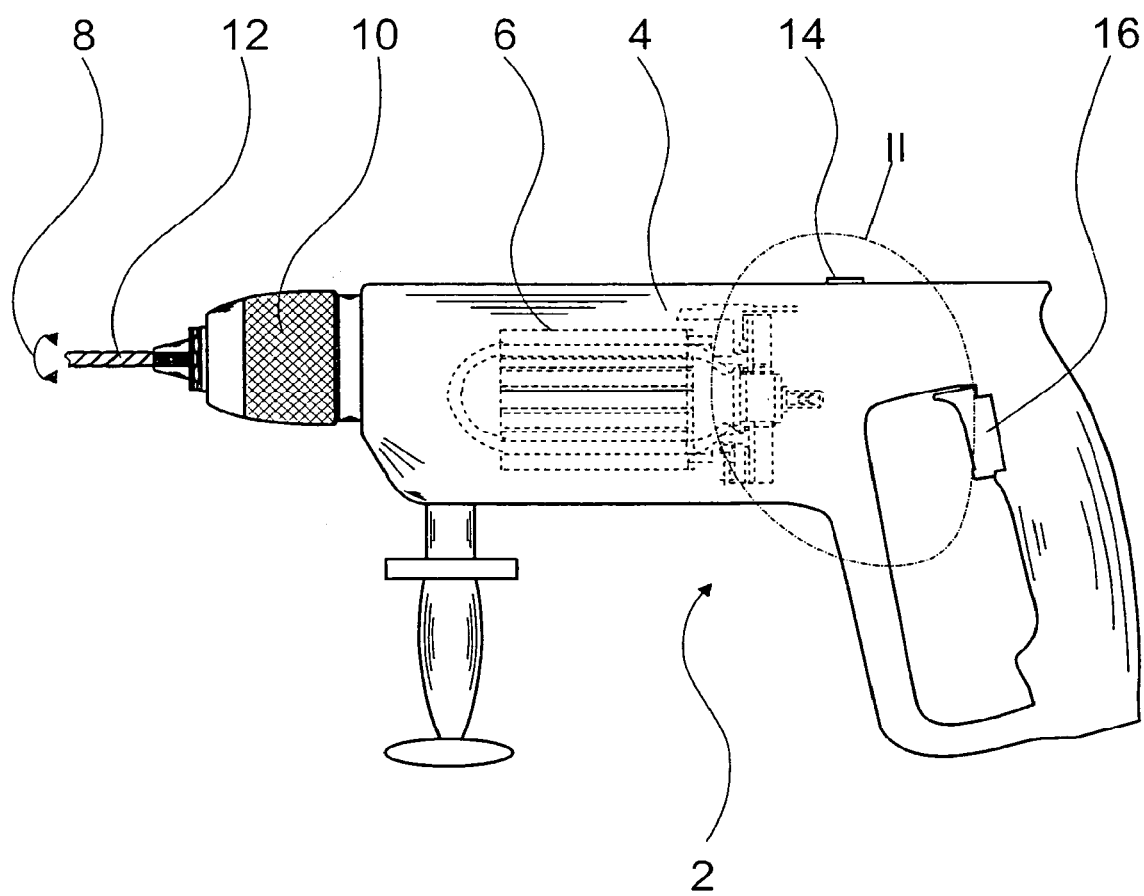
FIG. 1 is a schematic side view of a drill hammer.

FIG. 1 shows a power tool 2, embodied as a drill hammer, with an electric motor 6, mounted in a housing 4, whose direction of rotation 8 of a tool 12, fastened in a tool holder 10, can be selected via an actuating element 14. The direction of rotation 8 in this way includes a first direction of rotation 8 for clockwise operation and a second direction of rotation 8, opposite the first direction of rotation 8, for counterclockwise operation. The actuating element 14 is located in the vicinity of a pushbutton switch 16, so that a user of the power tool 2 can operate both the pushbutton switch 16 and the actuating element 14 with one hand.

Figure 2:
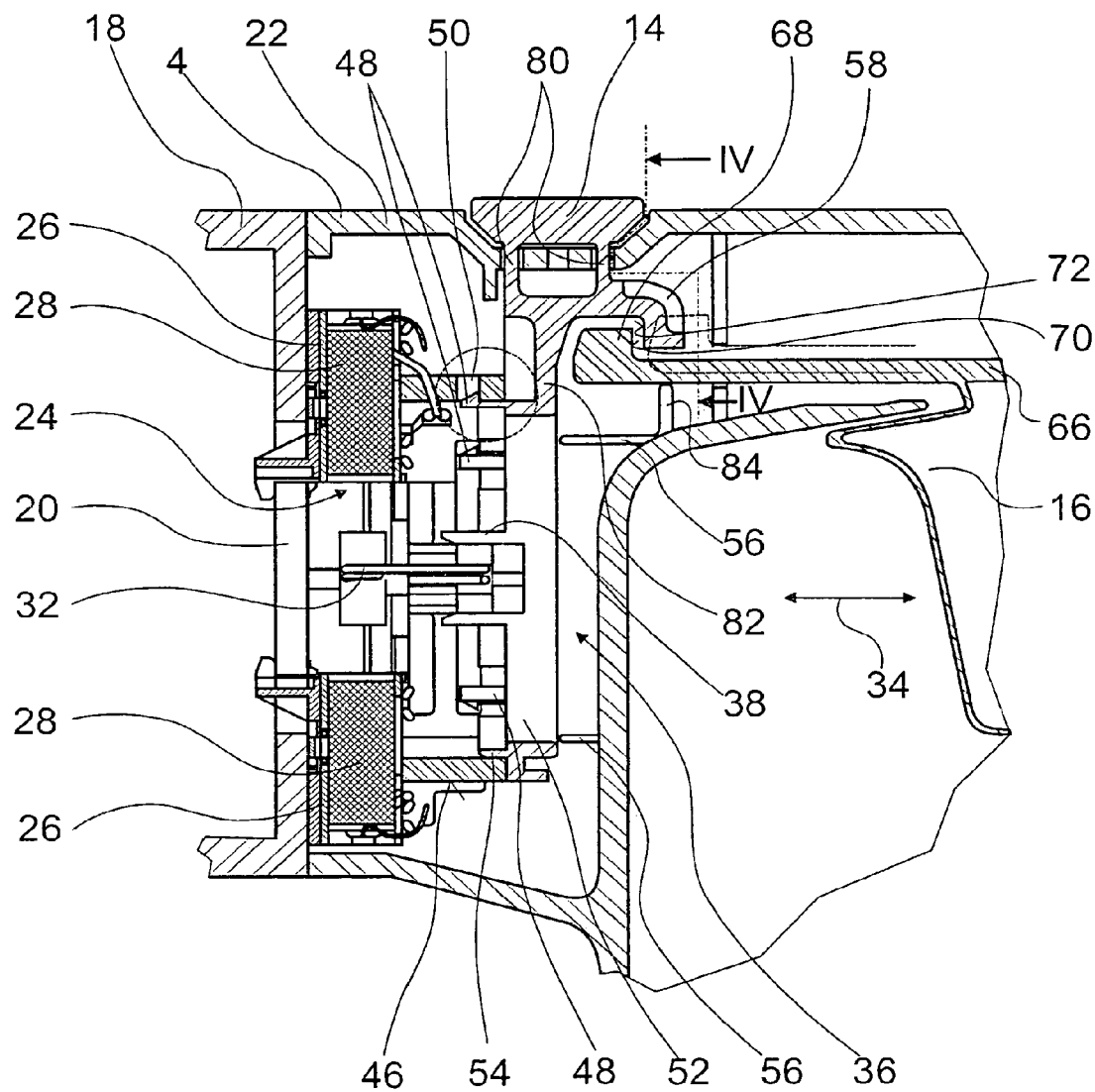
FIG. 2 is a longitudinal section through a detail II of FIG. 1 of the power tool in accordance with the present invention.
Figure 3:
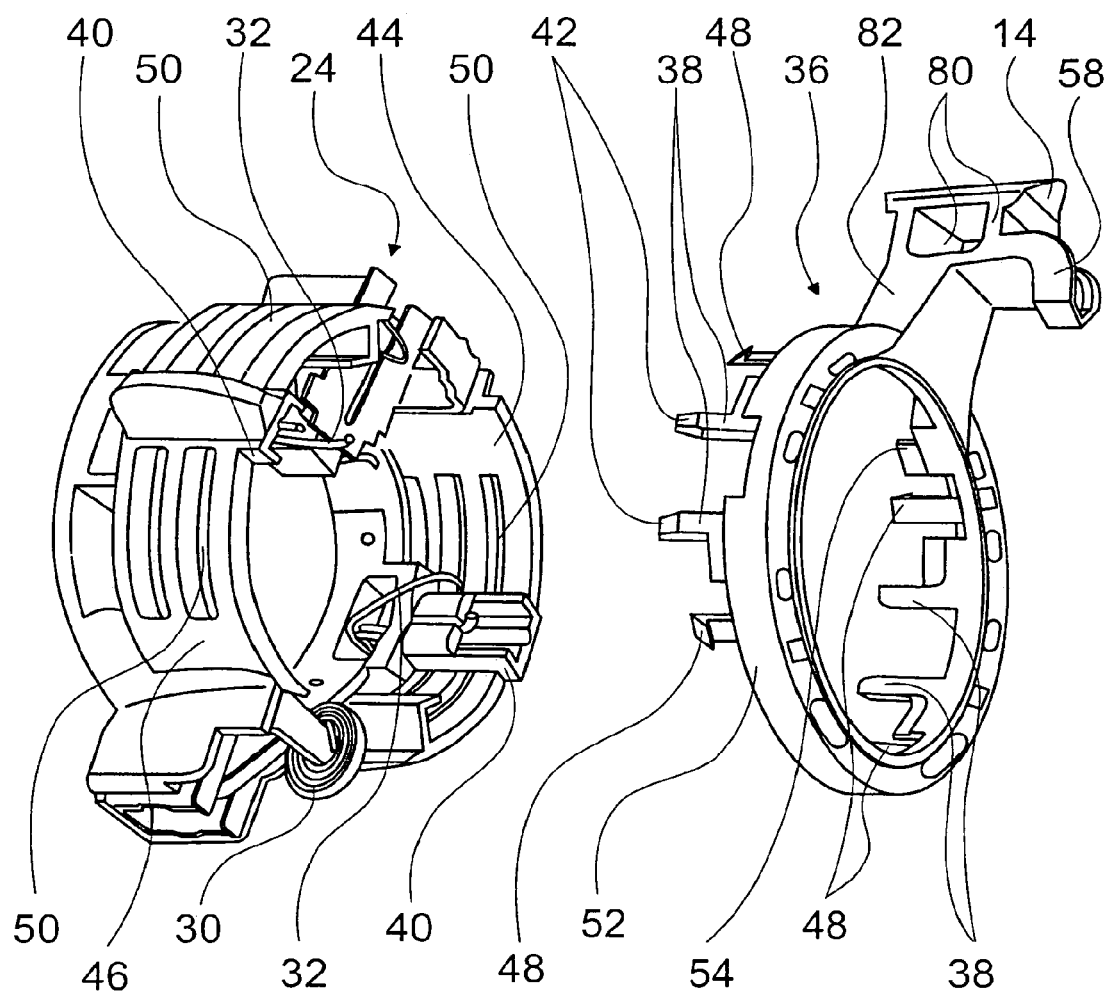
FIG. 3 shows a brush element with a switch means in an exploded view of the power tool in accordance with the present invention.

FIG. 2 shows a detail 11 of the power tool 2 of FIG. 1 in a longitudinal section. The electric motor 6, which is not shown in FIG. 2 for the sake of simplicity, is located in a front part 18 of the housing 4. A rotor of the electric motor 6 protrudes with a commutator through a housing opening 20 into a rear part 22 of the housing 4. There, it is surrounded by a brush element 24, which includes two diametrically opposed brush holders 26 embodied as carbon quivers. One carbon brush 28 is inserted into each of the brush holders 26, and these carbon brushes are pressed radially inward against the commutator, not shown, by spring elements 30—one of the two spring elements 30 is shown in FIG. 3. The brush element 24 is urged from a neutral, unstable, middle position in the circumferential direction, each in the direction of one end position, via two leg springs 32 that have a bistable position. Depending on the end position, the commutator is supplied with current for clockwise operation or counterclockwise operation.

A switch means 36 is slipped onto the brush element 24, located on the electric motor not shown in FIG. 2, in the axial direction 34, or in other words parallel to the tool 12 and toward the tool 12 or the electric motor 6. The actuating element 14 is an integral component of this switch means 36.

The switch means 36 and the brush element 24 are shown in perspective and in an exploded view in FIG. 3. For slipping the switch means 36 onto the brush element 24, the switch means 36 includes four centering means 38, in the form of projections which when the switch means 36 is slipped onto the brush element 24 embrace two retaining elements 40 on both sides. A different number of centering means is also conceivable. For problem-free centering of the switch means 36 on the brush element 24, the centering means 38 include chamfers 42, which make it easier to provide guidance on both sides of the retaining elements 40 and into a retaining ring 44. The retaining ring 44 is part of the brush element 24 and embraces the commutator, not shown, annularly. It supports the brush holder 26 and has a radially outward-pointing jacket face 46. The centering means 38 engage this retaining ring 44 radially from the inside and retain the switch means 36 in an unambiguously defined way in the radial and tangential directions to the brush element 24.

As the switch means 36 is slipped farther onto the brush element 24, detent means 48 in the form of detent hooks come into contact with the retaining ring 44; in the drawing, there are four detent hooks, as an example. As the switch means 36 continues being slipped on, these detent means are pressed radially inward by the retaining ring 44 and slide along an inside face of the retaining ring 44, until they snap radially outward into ventilation slits 50 of the brush element 24. By means of the detent means 48, a form lock of the switch means 36 to the brush element 24 in the axial direction 34 comes about.

In FIG. 2, one additional detent element 48 is shown in section within a circle drawn in dashed lines, to illustrate the position of the four detent elements 48. The detent element 48 engages one of the ventilation slits 50 and reaches only partway through it. The centering means 38 protrude past the detent means 48 somewhat in the axial direction 34, so that when the switch means 36 is slipped onto the brush element 24, first the centering means 38 position the switch means 36 in a centering way, and only after that do the detent means 48 come into contact with the retaining ring 44.

Once the detent elements 48 have snapped into place, the switch means 36 rests with an annular element 52 on the retaining ring 44 of the brush element 24 in the axial direction 34 and is joined to it in a way secure against tilting. For more extensive retention of the switch means 36 on the brush element 24, the annular element 52 has two further centering means 54, which rest on the inside face of the retaining ring 44 and hold the annular element 52 on the retaining ring 44 in a defined way in the radial direction. The annular element 52 engages the retaining ring 44 with both the centering means 38 and the detent means 48 and the further centering means 54. During the operation of the power tool 2, for the sake of further security, struts 56 of the housing 4 hold the annular element 52 in the axial direction 34 on the brush element 24.

By an actuation of the actuating element 14 by a user, the switch means 36 can now be moved in the direction of rotation 8 from one end position to the other end position, and in this way clockwise operation or counterclockwise operation of the electric motor 6 can be established. To prevent shifting of the switch means 36 while the pushbutton switch 16 is simultaneously pressed, the switch means 36 has a blocking element 58, which is joined integrally to the actuating element 14 and to the annular element 52. The blocking element 58 is shown in a top view in FIG. 4.

Figure 4:
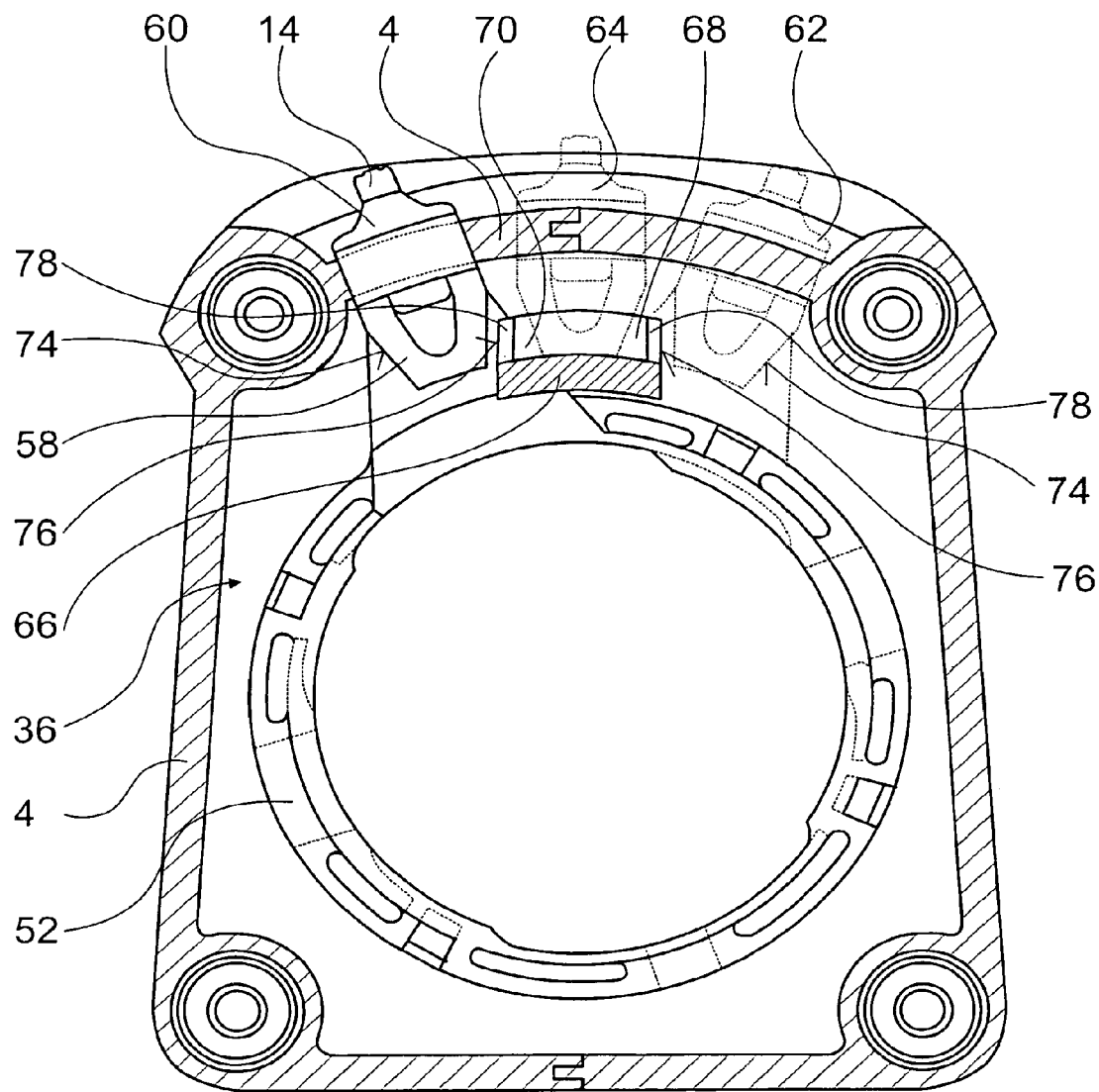
FIG. 4 is a section taken along the line IV in FIG. 2 of the power tool in accordance with the present invention.

FIG. 4 shows the switch means 36 in a top view from the direction of the pushbutton switch 16 forward toward the electric motor 6 and the tool 12. Three positions of the actuating element 14 are shown: an outer end position 60 for counterclockwise operation and, shown in dashed lines, a second outer end position 62 for clockwise operation, and an unstable middle intermediate position 64 located between the two positions 60, 62. From the middle intermediate position 64, the actuating element 14 is pressed by the leg springs 32 into one of the two end positions 60, 62. In FIG. 2, the actuating element 14 is shown in the intermediate position 64.

A securing means 66 is shown in section in FIG. 4; it is formed integrally onto the pushbutton switch 16 and includes a securing head 68. If the actuating element 14 with the blocking element 58 is in an intermediate position 64 between the end positions 60, 62, then the blocking element 58 is located behind the securing head 68 in the axial direction 34. As shown in FIG. 2, the securing head 68 is pulled, offset slightly obliquely from the axial direction 34, to the rear upon an actuation of the pushbutton switch 16 and comes to rest, with a securing face 70, on a blocking face 72 of the blocking element 58. Further pressing of the pushbutton switch 16 into a turn-on position of the electric motor 6, which is shown in dashed lines in FIG. 2, is prevented in this way by the blocking element 58. The struts 56 secure the switch means 36 against being pulled off in the axial direction 34 when the pushbutton switch 16 is pressed. Support ribs 84 support the securing means 66 against sagging downward.

To enable an actuation of the pushbutton switch 16 from a turn-off position into a turn-on position, the actuating element 14 with the blocking element 58 must first be put in one of the two end positions 60, 62. Then the securing means 66, with its securing head 68, can be moved past the blocking element 58, and the pushbutton switch 16 can be put in a turn-on position.

If the actuating element 14 is in one of the two end positions 60, 62, and the pushbutton switch 16 is in the turn-on position, then the securing means 66 is located in the position shown in dashed lines in FIG. 2. As shown in FIG. 4, upon a rotation of the actuating element 14 out of one of the end positions 60, 62 in the direction of an intermediate position 64, one of the two lateral blocking faces 74 comes into contact with one of two securing faces 76 of the securing head 68. Further rotation of the actuating element 14 out of the end positions 60, 62 in the direction of an intermediate position 64 is blocked. A switchover of the electric motor 6 from clockwise operation to counterclockwise operation or vice versa is thus impossible when the pushbutton switch 16 is pressed. If the actuating element 14 is not entirely in one of the end positions 60, 62, then upon actuation of the pushbutton switch 16, the blocking element 58 and with it the actuating element 14 are pressed into the respective end position 60, 62 by one of the lateral slanted faces 78 of the securing head 68.

The actuating element 14 is joined stably to both the blocking element 58 and the annular element 52 of the switch means 36 by two strutlike retaining elements 80 (see FIG. 2). Even if strong pressure is put on the actuating element 14, the two retaining elements 80 prevent the actuating element 14 from becoming bent. The retaining elements 80 are each embodied as an elongated strut, which is oriented perpendicular to the plane of the paper in FIG. 2 and is shown in a perspective view in FIG. 3. The retaining elements 80 are thin and reach through ventilation slits of the housing 4.

Between the actuating element 14 and the annular element 52, the switch means 36 has a connecting element 82. Depending on the design of this connecting element 82, the actuating element can be positioned farther forward toward the electric motor 6 or farther to the rear toward the pushbutton switch 16 in terms of its position relative to the brush element 24. As a result, the switch means 36 is very flexibly adaptable to various housing geometries. In the version of the switch means 36 shown in FIG. 2, the actuating element 14 is located predominantly behind the brush element 24 in the axial direction 34 and thus relatively close to the pushbutton switch 16.

It will be understood that each of the elements described above, or two or more together, may also find a useful application in other types of constructions differing from the types described above.

While the invention has been illustrated and described as embodied in a powertool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A power tool, comprising an electric motor; a brush element supported rotatably for switchover between clockwise operation and counterclockwise operation of said electric motor, said brush element including at least one brush holder; and switch means embodied separately from said brush element and connected in form-locking fashion to said brush element, said switch means having an actuating element for actuation by a user, said switch means being slippable in an axial direction onto said brush element which is located on said electric motor and being connected in a form-locking manner in the axial direction to said brush element, so that said switch means and said brush element are held together without an aid of additional elements.

2. A power tool as defined in claim 1, wherein said brush element includes a retaining ring supporting said brush holder, said switch means being connected in form-locking fashion to said retaining ring in the axial direction of said electric motor.

3. A power tool as defined in claim 1, wherein said switch means and said brush element have detent means for detent-locking connection of said switch means on said brush element.

4. A power tool as defined in claim 1, wherein said brush element includes a retaining ring supporting said brush holder, said switch means including an annular element resting in the axial direction on said retaining ring.

5. A power tool as defined in claim 4, wherein said annular element engages an inside of said retaining ring.

6. A power tool as defined in claim 1, wherein said actuating element is located at least predominantly on a side of said brush element facing away from said electric motor in the axial direction.

7. A power tool as defined in claim 1; and further comprising centering means, said brush element including a retaining ring supporting said brush holder, said centering means being prepared for radially centering said switch means on said retaining ring upon installation of said actuating element.

8. A power tool as defined in claim 1; and further comprising a pushbutton switch having a turn-on position for switching said electric motor on and a turn-off position for switching said electric motor off; and securing means to which said pushbutton switch is connected, said switch means including a blocking element for contacting said securing means, said securing means, when said pushbutton switch is in the turn-on position, blocking rotation of said actuating element for switchover of said brush element by a contact with said blocking element.

9. A power tool as defined in claim 1; and further comprising a pushbutton switch having a turn-on position for switching said electric motor on and a turn-off position for switching said electric motor off; securing means to which said pushbutton switch is connected, said switch means including a blocking element for contacting said securing means, and said blocking element, when said brush element is rotated into an intermediate position between clockwise operation and counter clockwise operation, blocking a switchover of said pushbutton switch from said turn-off position into said turn-on position by a contact with said securing means.

10. A power tool as defined in claim 1; and further comprising a housing having housing walls, wherein said housing walls separate a housing interior from a housing exterior, said actuating element being located at least partly outside said housing and being retained by at least two retaining elements protruding separately through at least one of said housing walls.

11. A power tool as defined in claim 1, wherein said actuating element is located at least substantially behind said brush element and said motor is located substantially in front of said brush element.

12. A power tool as defined in claim 1, wherein said brush element has a first side and a second side and said actuating element is located at least substantially on the first side of said brush element and said motor is located substantially on the second side of said brush element.

13. A power tool, comprising an electric motor; a brush element supported rotatably for switchover between clockwise operation and counterclockwise operation of said electric motor, said brush element including at least one brush holder; and switch means embodied separately from said brush element and connected in form-locking fashion to said brush element, said switch means having an actuating element for actuation by a user, said switch means being slippable in an axial direction onto said brush element which is located on said electric motor and being connected in a form-locking manner in the axial direction to said brush element, said switch means and said brush element comprising detent means for detent-locking connection of said switch means on said brush element in said form-locking manner, so that said switch means and said brush element are held together without an aid of additional elements.

* * * * *